Patented Feb. 6, 1945

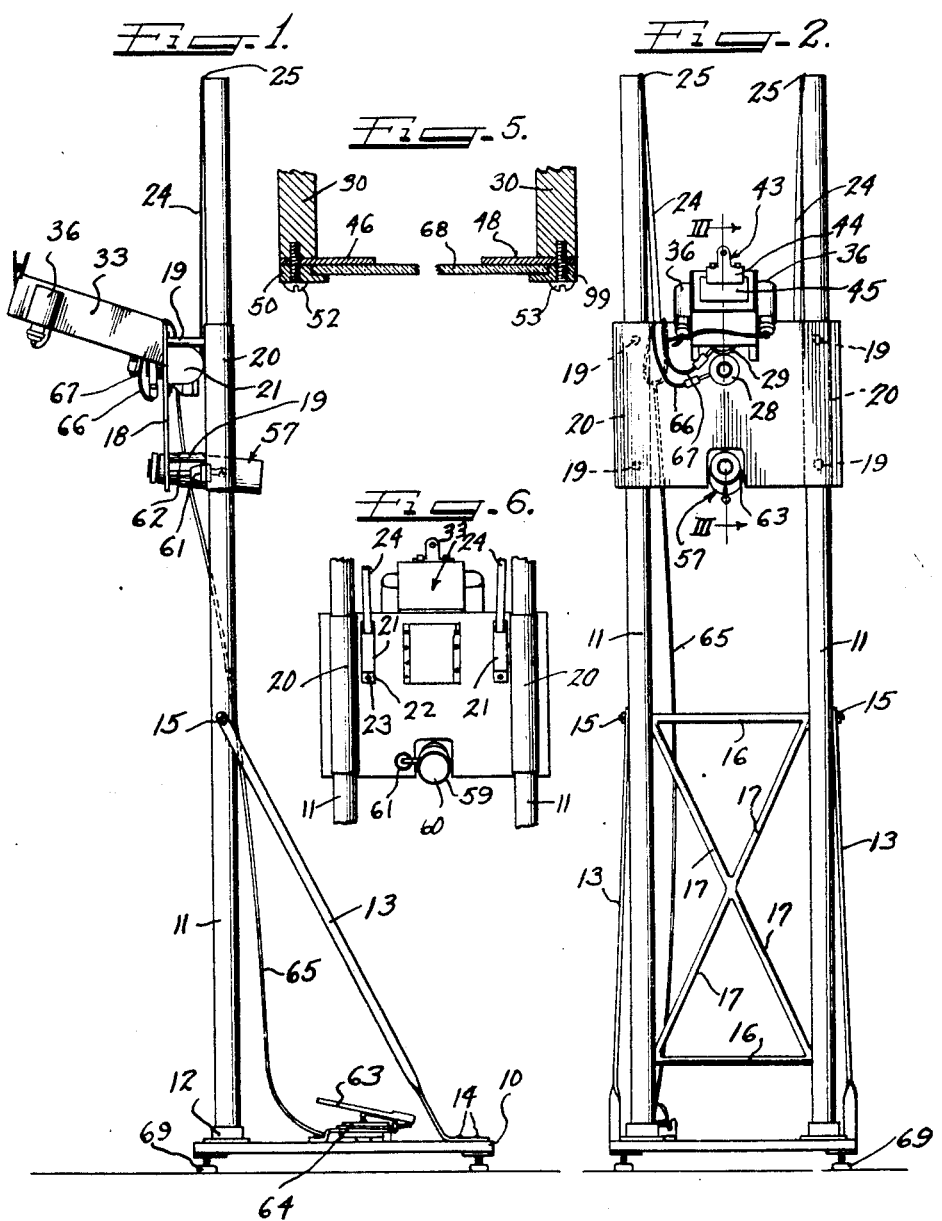

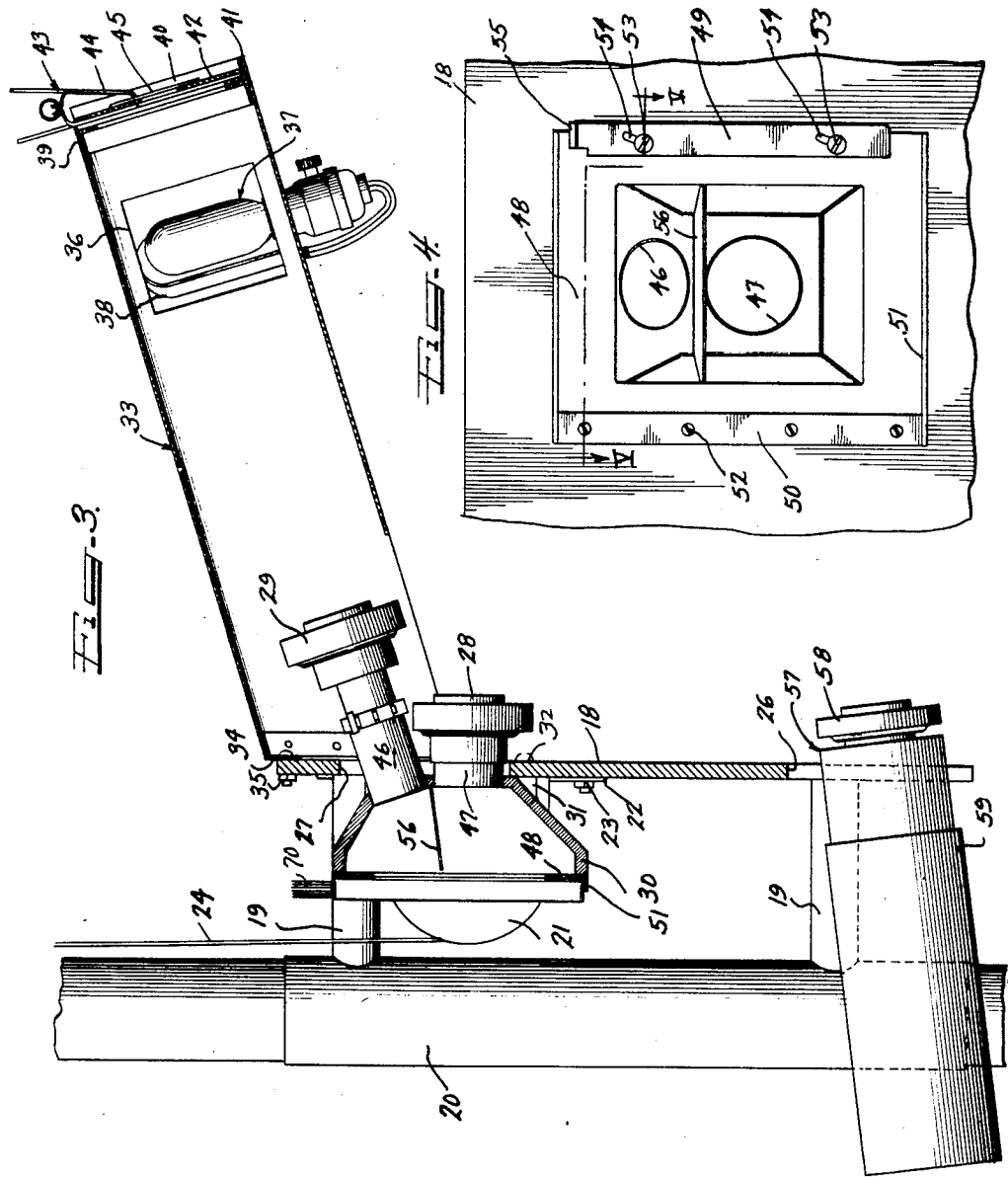

2,368,970

UNITED STATES PATENT OFFICE 2,368,970

CAMERA CONSTRUCTION

Norman L. Cook, Chicago, Ill.

Application November 17, 1941, Serial No. 419,424

1 Claim. (Cl. 88—24)

This invention relates generally to cameras, and is directed more particularly to an improved camera of the character utilized for identification photography.

In the use of cameras of the above character, it is necessary that the features of the employee-subject be brought out very clearly for easy and complete identification, and this is particularly important with respect to the development of any facial peculiarities, such as scars or noticeable wrinkles and other depressions in the contour of the face.

To attain the above end it has been found necessary to obtain extreme accuracy of focus, and furthermore, it is highly desirable to prevent blurring of the outlines of the subject in the picture usually caused by vibration of the camera and the camera stand. The difficulties encountered in the past, because of blurring, will be particularly understood when it is noted that companies having many employees can not afford to waste man-hours by presenting their employees at photographic studios. In other words, it is necessary that the photograph be taken at the plant in a minimum of time and, of course, in the presence of considerable vibration often occurring when heavy machinery is being operated during the photographing process.

It will also be understood that under such conditions the camera must necessarily be moved into the plant and therefore while considerable weight of the camera and stand (on the order of 300 pounds) is necessary to withstand the detrimental effects of such vibrations, the camera must at the same time be constructed so that it is easily portable and movable by the photographer.

To the end that the above disadvantages may be overcome, and as an important object of the invention, there is provided herein a camera assembly so constructed and arranged that the weight of the photographer may be utilized as an inherent portion of the weight of the camera during use.

With the above problem, presented by the necessity of moving the camera from place to place, in mind, it is also desirable that the camera assembly be constructed to occupy a minimum amount of space.

To the end that the above advantages may be obtained, and as another object of the invention, there is provided herein an improved camera assembly and stand which may be cheaply constructed, which occupies a minimum amount of space, and which is constructed and arranged to be utilized in rapidly photographing successive subjects of different heights, with whose photographs different identifying indicia, such as a signature, a printed name, identifying number or thumbprints or fingerprints may be associated upon the finished picture.

It has been found in the past that, to obtain a photograph of maximum clarity and fidelity with which the identifying indicia of the above character is associated, the subject, to obtain maximum clarity, must be relatively removed from the lens of the camera, while the identifying indicia such as writing, printing or thumbprints, if it is not to be enlarged to a considerable degree prior to being photographed, must be relatively close to the lens of the camera.

To this end, and as a further object of the invention, there is provided herein a camera construction which, by a single exposure, will photograph the image of a subject removed from the camera, and which will at the same time photograph identifying indicia from an image thereof which is normal, thus obviating the necessity of enlarging the latter.

As indicated above, a camera of the character here involved must be available for photographing in quick succession, subjects whose heights may vary anywhere from four feet six inches to six feet six inches. It is necessary, under such conditions, that the camera be mounted in the assembly for easy and rapid adjustment to easily and rapidly manipulate the camera relative to the stand to accurately center the subject in the field of the camera view. To accomplish this, and as a further object of the invention, there is provided herein, in conjunction with the camera lens, a view finder which is adjustably mounted relative to the camera lens and in which the field of the camera lens may be centered, regardless of the distance of the subject from the lens. Thereafter, the finder is utilized for accurately centering the subjects of varying heights as they successively appear before the camera.

It is a further object of the present invention to provide a view finding arrangement which, when properly manipulated and properly positioned, corrects for parallax.

Still another object of the invention is to provide a double lens camera construction, one lens being adapted to receive an image of identifying indicia, while the other is adapted to receive the image of the subject being photographed, in which means is provided to sufficiently separate the images as received upon the surface of the film thereby to provide a negative in which both the features of the subject and the identifying indicia appear with maximum clarity.

In accordance with the general features of the invention, there is provided herein a camera assembly, the structural parts of which have been reduced to a minimum to provide a light weight, cheap construction, and which is constructed to receive the photographer, whereby the weight of the latter plus that of the structure provided is sufficient to avoid the detrimental effects of the vibration of the camera assembly.

In accordance with still another feature of the invention, there is provided herein a camera stand having vertical standards adapted to receive a mounting assembly in slidable relationship, this assembly carrying a camera, together with a view finder adapted to compensate for parallax.

In accordance with still another feature of the invention, there is provided herein apparatus well adapted for identification photography which includes a camera having one lens directed toward a subject in a remote plane and still another lens aligned in a photographing chamber at the other end of which is an assembly adapted to receive in quickly demountable relationship, an identifying indicia carrying member, both lenses being adapted to impress the respective images received thereby upon a single film by virtue of a single photographing manipulation.

Other objects and advantages of the invention will become apparent from the following description and accompanying drawings, in which:

Figure 1 is a side elevation of the camera and camera stand assembly;

Figure 2 is a front elevation thereof;

Figure 3 is a cross section taken generally on the line III—III of Figure 2, with the view finder and lens housings shown in elevation;

Figure 4 is a fragmentary rear view showing the camera box portion with the film removed;

Figure 5 is a fragmentary cross sectional view taken on the line V—V of Figure 4, with the ground glass mounted in the film pack holder; and Figure 6 is a rear fragmentary elevation of the camera assembly.

It will be understood that the embodiment shown herein is for illustrative purposes and may be changed or modified without departing from the spirit and scope of the invention, as set forth in the appended claim.

Referring to the drawings, particularly to Figures 1 and 2, the assembly shown herein includes generally a stand comprising a platform 10 having substantially vertical standards 11, mounted thereon by bosses 12 which are secured to adjacent corners of the platform in any suitable manner and which removably receive the lower ends of the respective standards. These standards are braced in their upright positions in any suitable manner, as for instance, by stays 13 which have their lower ends removably secured to the respective opposed corners of the platform as by bolts 14 shown in Figure 1. The upper ends of the stays 13 are likewise removably secured to the standards 11 by means of bolts 15 as shown in Figures 1 and 2.

To afford rigid lateral support for the standards 11 there is provided herein cross stays including lateral portions 16 and diagonal portions 17 which may be suitably secured at their ends to the respective standards in any suitable manner, such as by brazing or welding.

From the foregoing, it will be seen that the standards 11, upon which the camera proper is mounted in a manner to be presently described, are rigidly mounted upon the platform 10 in such a manner that they may be quickly and easily removed therefrom and assembled thereon. It will also be seen that the structural parts of the stand are such that even though made in a manner that they afford considerable weight, they are of such simple construction that they occupy a minimum amount of space when broken down and thus provide for maximum convenience in transportation.

The camera assembly proper, as shown herein, includes a mounting element 18 having arms 19 secured to one suffice thereof as by brazing or welding and by which it may be mounted from each side to a respective sleeve 20, one of which is provided on each of the standards 11. The general relationship between the mounting member 18, arms 19 and sleeves 20 is clearly shown in Figures 1 and 3, and the relationship of the arms and sleeves with respect to the mounting member 18 is shown clearly in dotted lines in Figures 2 and 6.

As shown in Figures 1, 3 and 6, the plate-like mounting member has a pair of housings 21 mounted thereon by flanges 22 and by bolts 23. These housings 21 are of the type having spring actuated reels rotatably mounted therein, the reels having supporting tapes 24 wound thereon. The outer ends of the tapes 24 are secured to the top of the standard 11 by hooks 25 and with this arrangement it will be seen that with the tension of the springs within the housings properly calibrated the mounting member 18 and sleeves 20, together with their associated parts may be slidably supported by the standards 11 in balanced relationship so that vertical adjustment of the camera assembly, to be more fully described presently, may be obtained with a minimum of effort. It has been found that if the reels with their springs are adjusted so that the tension of the springs is overcome slightly by the weight of the camera assembly, an ideal relationship exists between the standards and the camera assembly in that the latter may be easily moved up and down upon the standards, but will maintain a given position rigidly after the adjustment has been made.

The mounting member 18 is provided with a cut away 26 at its lower edge and has an aperture 27 located centrally in the upper portion thereof. By reference to the drawings, and particularly to Figure 3, it will be seen that the aperture 27 of the mounting member 18 is adapted to receive a pair of lens mountings 28 and 29 which are secured in angular relationship in a camera box 30 for purposes to be described presently. The camera box 30 is provided with a plurality of bosses, one of which is shown at 31, the bosses being threaded to receive screws 32 by means of which the camera mechanism is secured to the member 18 with the camera box rearwardly thereof and the lens mounting projecting forwardly thereof.

The lens in the mounting 28 shown herein is that which is adapted to be directed at the subject being photographed, while the lens within the housing 29 is that which is adapted to receive the image of the identifying indicia for the particular subject being photographed. Preferably the lens in the mounting 28 is directed in a substantially horizontal plane.

As previously stated, identifying indicia, such as social security numbers, signatures, printed names, and particularly thumb and fingerprints, in order to be clearly defined upon the film, must be focused, not from the distance at which the subject is located from the camera, but rather must be photographed as a "close up" shot. It will be readily understood by those skilled in the art that if the subject being photographed is located remotely from the lens a much smaller film may be utilized in making a full head and shoulders picture. However, if the desired informative data is to be photographed from a placard or the like which is placed in the plane of the subject, such data must be of considerable size, in fact, it must be enlarged to be commensurate with the head and shoulders of the subject. Under such circumstances, it will be seen that while numbers and perhaps printed names may be of such enlarged size, signatures and finger and thumbprints must be enlarged at considerable expense and trouble in order that they appear legible upon the finished picture or film.

In view of the above, it will be seen that the optimum is to simultaneously photograph the features of the subject together with the informative data, having the latter appear upon the picture legibly without first having been enlarged or in any other way processed preparatory to the photographing operation. To this end there is provided herein, in association with the lens in the lens mounting 29, a chamber designated generally as 33. Generally speaking, the chamber 33 constitutes a tube-like extension mounted upon the member 18 as by flanges 34, 35. The viewer is open at its rear end to receive the lens mounting 29 and is also provided with an opening at the lower wall thereof so that the lens mounting 29 is accessible for adjustment.

The chamber 33 is provided, in the vicinity of its forward end, with outwardly disposed housings 36 on each side thereof, each of which is constructed and arranged to receive a suitable source of light 37 for illuminating the forward end of the chamber. If desired, the intensity of the illumination at the forward end of the chamber may be increased by the utilization of a suitable reflectors 38 as shown in Figure 3.

The extreme forward end of the chamber 33 is supported by a member 39 having angular cross section and formed to conform to the cross sectional figuration of the chamber.

As shown in Figure 3, the viewer is so constructed that one side wall 40 and the lower wall 41 thereof extend beyond the member 39 thereby providing a seat for the holding member utilized to hold the card bearing the informative data to be photographed. The card holder may be of any suitable construction and includes in the present instance a frame 42 having a central aperture therein and having a spring clip member 43 suitably secured thereto in such a manner that one leg 44 thereof may be manipulated toward and away from the frame 42 in order that an indicia bearing card 45 may be removably secured in position over the aperture in the frame. It will be readily understood that the extensions 40 and 41 may be used to quickly position the card holding member in proper alignment at the forward end of the chamber so that the indicia on the card 45 will be properly centered with respect to the lens in the mounting 29.

From Figure 3, it will be seen that the lens mounting 29 is so positioned that the rear extension 46 thereof is directed at the upper portion of the rear of the camera box 30, while the rear extension 47 of the lens holder 28 is directed at the lower portion of the rear plane of the camera box.

As best shown in Figures 3, 4 and 5, the camera box or housing 30 is provided at its rear opening with a frame member 48 which delimits the aperture through which the images received by the lenses in housings 28 and 29 are impressed upon the film.

To the end that the film may be retained in operative position, there is provided herein a film pack retaining compartment which comprises side elements 49 and 50 extending rearwardly and inwardly to form film pack retaining grooves. The bottom wall of the film pack retaining compartment may be constructed in any suitable manner, as for instance by forming the lower edge of the frame 48 into an angular rearwardly extending portion 51. As shown best in Figures 4 and 5 the member 50 is shown secured to the camera body by means of screws 52, while the member 49 is likewise mounted on screws 53, but is provided with angularly disposed slots 54 in which the shanks of the screws ride whereby when the member 49 is raised by manual engagement of the rearwardly extending lip 55, a lateral motion is imparted to the member 49 to obviate the necessity of withdrawing the film pack upwardly and outwardly of the grooves formed by the members 49 and 50.

As will be readily understood by those skilled in the photographic art, lack of clarity of the image received by the film may result from confusion of the varying intensities of illumination received by the lenses in the housings 28 and 29. To the end that this may be avoided there is provided herein a light impervious divider 56 which is mounted in any suitable manner on the forward wall of the camera box 30 and extends rearwardly thereof. This divider 56 is constructed and arranged in any suitable manner whereby it may be adjusted vertically within the camera 30 depending upon the amount of informative data which must be accommodated upon the film. Furthermore, the divider is of a width sufficient to extend substantially entirely across the camera box 30, but terminates short of the surface of the film whereby the latter is not scratched during manipulation.

As stated previously, the successive subjects photographed by the camera disclosed herein are of varying heights. Therefore, it becomes necessary to adjust the height of the lens in the mounting 28 for each successive photograph. As also stated above, an essential attribute of cameras utilized for taking identification photographs of employees is that a series of photographs may be taken in a minimum amount of time thus utilizing a minimum number of manhours for the photographing procedure, or at least the exposure portion thereof. Under such circumstances, the impracticability of repeatedly withdrawing the film pack for adjusting the camera to accommodate successive subjects will be readily understood, as a time consuming manipulation. Heretofore, it has been customary to construct the camera assembly with a table member extending from the camera to the subject whereby the remote end of the table may be manipulated with the camera to the proper height as indicated by the position of the head and shoulders of the subject relative to the remote end thereof. Such a construction, however, has proved exceedingly cumbersome and has detracted considerably from the transportability of the device.

To the end that there may be provided an auxiliary view finder which adjusts for parallax and which is available at all times regardless of the presence of a film pack in the camera, a view finder 57 is associated with the camera assembly for vertical adjusting movement therewith.

The view finder 57 includes a lens mounting 58 at the forward end thereof and a cylindrical casing 59 extending rearwardly of the lens mounting. As shown in Figure 6, the casing 59 is provided at its rear end with a ground glass 60 having suitable hair lines disposed thereon in the form of a cross, these hair lines intersecting at the center of the ground glass. The view finder 57 may be adjustably mounted upon the member 18 in any suitable manner. In the present instance, the means for mounting the view finder 57 includes a universal socket assembly 61 having one arm 62 thereof secured to the member 18 by brazing or welding, and the other arm 63 secured to the cylindrical portion 59 of the view finder. As shown on the drawings, the view finder is so disposed relative to the member 18 that the forward lens portion thereof extends through the cut away 26.

As indicated above, the lens mountings 28 and 29 are of any conventional type, and preferably of that type embodying suitable shutter mechanisms which may be actuated by compressed air. In the present embodiment, there is mounted upon the platform 10 a foot pedal 63 which has a plunger-cylinder mechanism 64 associated therewith. Air pressure from the cylinder of the latter mechanism is transmitted through the flexible tubing 65, the latter having branches 66 and 67 at the upper end thereof, the branch 66 being attached to the shutter mechanism of the lens mounting 28, while the branch 67 is similarly attached to the lens mounting 29. From the foregoing, it will be seen that the operator by depressing the pedal 63 creates the necessary air pressure which is transmitted through tubes 65, 66 and 67 to the shutter mechanisms of the respective lens mountings to actuate the same simultaneously.

From the foregoing, it will be seen that the above described mechanism may be completely broken down by disconnecting the tubes 66 and 67 from the respective lens mountings; raising the sleeves 20 upwardly of the standards 11 and off of the top thereof, at the same time disengaging the hooks 25 from the tops of the standards 11; removing bolts 14 and 15 to detach the stays 13 and finally by raising the standards 11 from within the bosses 12. When so broken down it will be seen that the camera assembly with its mounting may be placed individually in a suitable case and that the remainder of the apparatus may be easily transported by the operator as desired.

Upon reaching the particular location where the photographs are to be taken the operator may quickly assemble the apparatus into the form shown in Figures 1 and 2. Preferably the apparatus is positioned at a desired distance from a wall where a height chart can be hung in the vertical field of the lens in the mounting 28. The apparatus having been thus positioned, the operator then places a ground glass 68 (see Figure 5) in the film pack retaining compartment and through this ground glass and the lens in the mounting 28, adjusts the apparatus through a horizontal arc until the chart appears properly centered upon the ground glass 68. The operator then adjusts the screw mounted feet 69 on the bottom of the platform until the proper stance is obtained.

Having thus properly positioned the apparatus and having obtained the proper stance, the operator then centers the field which appears on the ground glass 68, in the ground glass 60 at the rear of the cylindrical portion 59 view finder 57. This having been done, it will be readily understood thereafter the field appearing upon the ground glass of the view finder will be identical to that which is transmitted through the lens of the mounting 28. The foregoing adjustments having been made, the operator may now remove the ground glass 68 and replace the same with a film pack as shown at 70 in Figure 3 and hence no further views need be taken through the lens of the mounting 28, the view finder 57 having been adjusted to view the same field.

It will be readily understood by those skilled in the photographic art that the relative angularity between the axis of the lens in the mounting 28 and that in the view finder will vary in accordance with the distance between the plane of the lens in the mounting 28 and the plane in which the subject to be photographed is located.

In view of the foregoing it will be seen that as subjects of varying heights appear successively before the camera the operator need merely view through the view finder 57 and while doing so raise or lower the sleeves 20 relative to the standards 11. This adjustment carries the mounting member 18, the camera and the view finder as a unit through a vertical path and the adjustment in each case is completed when the head and shoulders of the subject appear in the view finder 57. Thus it will be seen that subjects of varying heights are quickly and easily accommodated by simply sliding the camera assembly vertically relative to the standards 11, the assembly being maintained in its adjusted position by means of the supporting tapes 24 and their respective reel tensioning springs.

The individual photographing operations and the adjustments necessary for changing from one subject to the next successive subject are still further facilitated by means of the chamber 33 and its associated parts. As previously explained, in identification photography, particularly in connection with the present defense program, it is seldom sufficient that merely the photograph of the subject be used. Customarily the name, sometimes the signature and often the thumb or fingerprints of the subject are associated with the photographs. To afford maximum protection and identification, it will be understood that the optimum is that the identifying signature, name or print be disclosed directly on the photographs, since when this additionally identifying indicia is separate from the photograph great possibility for subterfuge and fraud are present. As also previously explained, while printed matter may be made large enough to appear in the photograph if placed in the vicinity of the subject when the exposure is made, fingerprints and signatures are of such a size that to so place them would render them unclear on the film. The enlargements necessary to rectify this difficulty have been found to be entirely too costly and too time consuming to be of any value. Accordingly, by the use of the mechanism disclosed herein, the identifying indicia may be placed upon a small card which when deposited in the holder 43 and positioned at the forward end of the chamber 33 will appear clearly upon the film and may be exposed simultaneously with the impression of the subject.

The time saving attribute of this feature of the invention will be readily understood when it is noted that the employees may be lined up in the order that their identifying cards appear in a stack. As the subject steps into the field of the camera the operator's assistant merely takes the next succeeding card on the stack, checks it with the employee, places it in the holder 43 and positions the holder 43 by resting it against the extensions 40 and 41 of the chamber 33. During this operation the operator is viewing the subject through the view finder 57 and adjusting the sleeves 20 upon the standards 11, whereupon the exposure may be made by depressing the foot upon the pedal 63 and thus the operation is completed and the procedure repeated with the next subject.

The identifying indicia appearing upon the card 45 may of course occupy varying areas in accordance with the nature of the data. This being the case, the operator may, while the ground glass 68 is in the film pack retaining compartment, adjust the divider 56 accordingly so that no more room than is necessary for the particular data is detracted from the space to be used by the head and shoulders of the subject.

From the foregoing it will be seen that there is provided herein a camera construction which is admirably adapted for identification photography in that the entire mechanism is both light and small; in that the exposure procedure for each subject may be accomplished rapidly even though considerable adjustment is necessary for each succeeding subject; and in that relatively minute identifying data, such as signatures or fingerprints may be simultaneously exposed to appear on the same film with the photograph of the subject.

I claim as follows:

In a camera, a box portion, film retaining means associated with said box portion, a pair of lenses disposed in said box portion to cast images on separate portions of a film in said retaining means said lenses having axes disposed at an angle to one another, a light impervious divider member extending laterally of said box and having one edge thereof mounted on the inner surface of said box between said lenses and extending rearwardly through the box to a plane adjacent that occupied by a film in the film retaining means, said divider member being constructed and arranged for vertical adjustment within the box to define a border between the portions of the film receiving the separate images from said lenses.

NORMAN L. COOK.